(12) United States Patent
Adler et al.

(10) Patent No.: US 6,662,148 B1
(45) Date of Patent: Dec. 9, 2003

(54) COMPUTATION OF SHAPES OF THREE-DIMENSIONAL LINKAGE STRUCTURES BASED ON OPTIMIZATION TECHNIQUES

(75) Inventors: Roy L. Adler, Chappaqua, NY (US); Jean-Pierre Dedieu, Toulouse Cedex (FR); Alan D. Kalvin, Irvington, NY (US); Joseph Y. Margulies, Pleasantville, NY (US); Marco Martens, Chappaqua, NY (US); Michael Shub, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,146

(22) Filed: Jan. 28, 2000

(51) Int. Cl.[7] .................................................. G06G 7/48
(52) U.S. Cl. ............................ 703/11; 703/2; 600/594; 600/407
(58) Field of Search ............................. 600/594, 407; 378/4, 207; 703/11

(56) References Cited

U.S. PATENT DOCUMENTS

| | | | | |
|---|---|---|---|---|
| 4,655,227 A | * | 4/1987 | Gracovetsky | 600/594 |
| 5,235,628 A | * | 8/1993 | Kalender | 378/207 |
| 5,575,765 A | * | 11/1996 | Foster | 602/32 |
| 5,682,886 A | * | 11/1997 | Delp et al. | 600/407 |
| 5,946,370 A | * | 8/1999 | Adler et al. | 378/4 |
| 6,422,874 B1 | * | 7/2002 | Green et al. | 434/274 |

OTHER PUBLICATIONS

"A Biomechanical Model of Lumbar Spine", S. Uppala et al, Department of Mechanical Engineering, University of Massachusetts, Amherst 1999.*
Newton Method on Riemannian Manifolds: Covariant Alpha–Theory, MIP Department of Mathematics, University Sabatier, France 2000.*
"Spinal Models Generated with Solid Elements", J. Wu, Chinese Journal of Med. Biol. Eng. vol. 16 No. 4, Dec. 1996.*
"Computer Simulation Studies of Cervical Spine Extension Mechanics", D.D. Angelo, 25th Meeting of the American Society of Biometrics, Sep. 1997.*
"A Cortico–Spinal Model of Reaching and Proprioception under Multiple Task Constraints", P. Cisek, Journal of Cogitive Neuroscience 10:4, pp. 425–444, 1998.*

* cited by examiner

Primary Examiner—Kevin J. Teska
Assistant Examiner—Fred Ferris
(74) Attorney, Agent, or Firm—Whitham, Curtis & Christofferson, P.C.; Stephen C. Kaufman (57) ABSTRACT

Spinal modeling is based on a concept called spinal energy which assumes that the spine assumes a shape to minimize spinal energy. Spinal energy depends on parameters called stiffness coefficients. These parameters can be determined from human data which, by hypothesis, are universal for a large class of humans. The method adapts Newton's method to the manifold $SO(3)^n$ to find a solution of model of the human spine. Where basins of attraction are small in Newton's method, homotopy methods are introduced to move from known solutions to unknown solutions. By setting the gradient of the spinal energy to zero, Newton's method is used to solve the inverse problem of finding stiffness coefficients from human data. A new approach to improving deformed spines uses the modeling method based on spinal energy. This approach preserves maximally the range of motion of the spine. The technique used is vertebraplasty; i.e., adding and/or subtracting material surgically from various vertebral bodies without fusing or altering soft tissue. An interactive process is used to determine the surgery to be performed to improve spinal shape.

8 Claims, 7 Drawing Sheets

COMPUTATION OF SHAPES OF THREE-DIMENSIONAL LINKAGE STRUCTURES BASED ON OPTIMIZATION TECHNIQUES

BACKGROUND OF THE INVENTION

1. Field of the Invention

The present invention generally relates to the computation of three-dimensional linkage structures, and more particularly to a method for calculating the deformation of a human spine caused by disease.

2. Background Description

Every year, approximately one-half million operations are performed in the United States on the spine. Many of these operations are performed to treat severe scoliosis, a condition which results in an acute curvature of the spine. Unfortunately, scoliosis and other spinal deformities have proved difficult to treat, and in fact represent one of the greatest challenges in medicine.

The conventional approach for treating severe deformations of the spine is surgery. Generally, surgery is performed to accomplish two goals; the primary goal is to prevent any further deterioration of the spine and the secondary goal is to correct as much as possible the deformation that has already occurred.

The current surgical procedure for correcting spinal deformities is spinal fusion. This procedure involves the permanent joining together of two or more vertebrae and has, at best, proved to be a temporary solution because it does not address the etiology and pathophysiology of the underlying disease. Other drawbacks of spinal fusion are apparent. For example, it is a crude mechanical approach which often leads to subsequent problems, such as permanent loss in the range of mobility. Also, while it has been recognized that the earlier surgery is performed the better the correction achievable, a decision to operate is often made at a point at which it would be better to do nothing if deterioration would cease.

In view of the foregoing considerations, it would be beneficial to have a methodology for predicting the future course of a spinal disease and its affect on curvature, and moreover to employ this methodology as a non-surgical option for assisting doctors in diagnosing and treating patients with spinal deformities.

SUMMARY OF THE INVENTION

It is a first objective of the present invention to provide a method for predicting the future course of a spinal disease in terms of its affect on curvature.

It is a second objective of the present invention to employ a method of the aforementioned type as a non-surgical option for assisting doctors in diagnosing and treating patients with spinal deformities.

It is another objective of the present invention to achieve the aforementioned objectives by formulating a mathematical model which gives a probabilistic indication of the progression of a spinal disease as it matures and the resulting affect on the curvature of a patient's spine, which model may be used by doctors as a tool for determining whether a surgical procedure could in fact achieve any successful results, and if so to indicate what type of procedure would prove most effective in correcting and/or staying the destructive effects of the disease.

It is another object of the invention to provide an interactive process to determine the surgery to be performed to improve spinal shape.

According to the invention, there is provided a modeling method based on a concept called spinal energy which assumes that the spine assumes a shape to minimize spinal energy. Spinal energy depends on parameters called stiffness coefficients. These parameters can be determined from human data which, by hypothesis, are universal for a large class of humans. The method of the invention adapts Newton's method to the manifold $SO(3)^n$ to find a solution of model of the human spine. Where basins of attraction are small in Newton's method, we introduce homotopy methods to move from known solutions to unknown solutions.

By setting the gradient of the spinal energy to zero, we can again use Newton's method to solve the inverse problem of finding stiffness coefficients from human data.

A new approach to improving deformed spines uses the modeling method based on spinal energy. This approach preserves maximally the range of motion of the spine. The technique used is vertebraplasty; i.e., adding and/or removing material surgically from various vertebral bodies without fusing or altering soft tissue. An interactive process is used to determine just what is to be added or removed to improve spinal shape.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is a method for generating a mathematical model simulating the manner in which the curvature of a human spine is deformed as a result of disease. The mathematical model is developed using methods of calculus on manifolds and global analysis to construct an algorithm that computes shapes of linkage structures subject to certain constraints. The constraints are derived from a predetermined hypothesis used to model the spine, and the algorithm is then used as a basis of a set of procedures which doctors may interactively use as a guide for surgical correction of three-dimensional spinal deformation. The present invention is also a method which uses the aforementioned model to predict the spinal deformity that may be expected to occur if the disease is allowed to progress.

In accordance with a preferred embodiment of the invention, the hypothesis for computing the model is based on the following set of assumptions.

(1) The erect stationary shape of the spine is the result of the body's attempt to maintain the head level over the pelvis while keeping the spine as flexible as possible.

(2) The complex of muscular forces, metabolic processes, and growth factors which drive the shaping can be boiled down to a function referred to as spinal energy. This function measures the deviation from desiderata specified in (1) Similar to Hooke's law, this function is a sum of squares of displacements weighted by quantities called stiffness coefficients which are from derived human data, to be described in greater detail below.

(3) The spine assumes a shape that minimizes spinal energy.

(4) A set of stiffness coefficients derived from a small sample of human data is universal for a large class of humans.

To formulate the model, it is preferrable to simplify the complexities of vertebral shapes by making certain crude approximations. First, only vertebral bodies are involved. Second, their top and bottom surfaces are assumed to be planar. Orthogonal matrices are used to specify these surfaces and spinal energy is defined in terms of components of these matrices along with widths of disks and heights of vertebral bodies. Stiffness coefficients can be defined in such a way as to incorporate limits of spinal movement which includes taking into account the anatomy of posterior elements among other things.

Minimizing spinal energy becomes a problem of finding critical points of a function of several variables subject to constraints. These critical points are determined using methods of calculus on manifolds and global analysis. In order to improve efficiency, a unique use is made of the differential group structure of orthogonal matrices.

Stiffness coefficients are estimated as follows. Starting with known shapes, the condition that spinal energies are at minimums leads to a system of equations which are linear in the unknown stiffness coefficients. The unknowns may be found by Cramer's rule or by the method of least squares in case the system is over or under determined.

Figure 1:
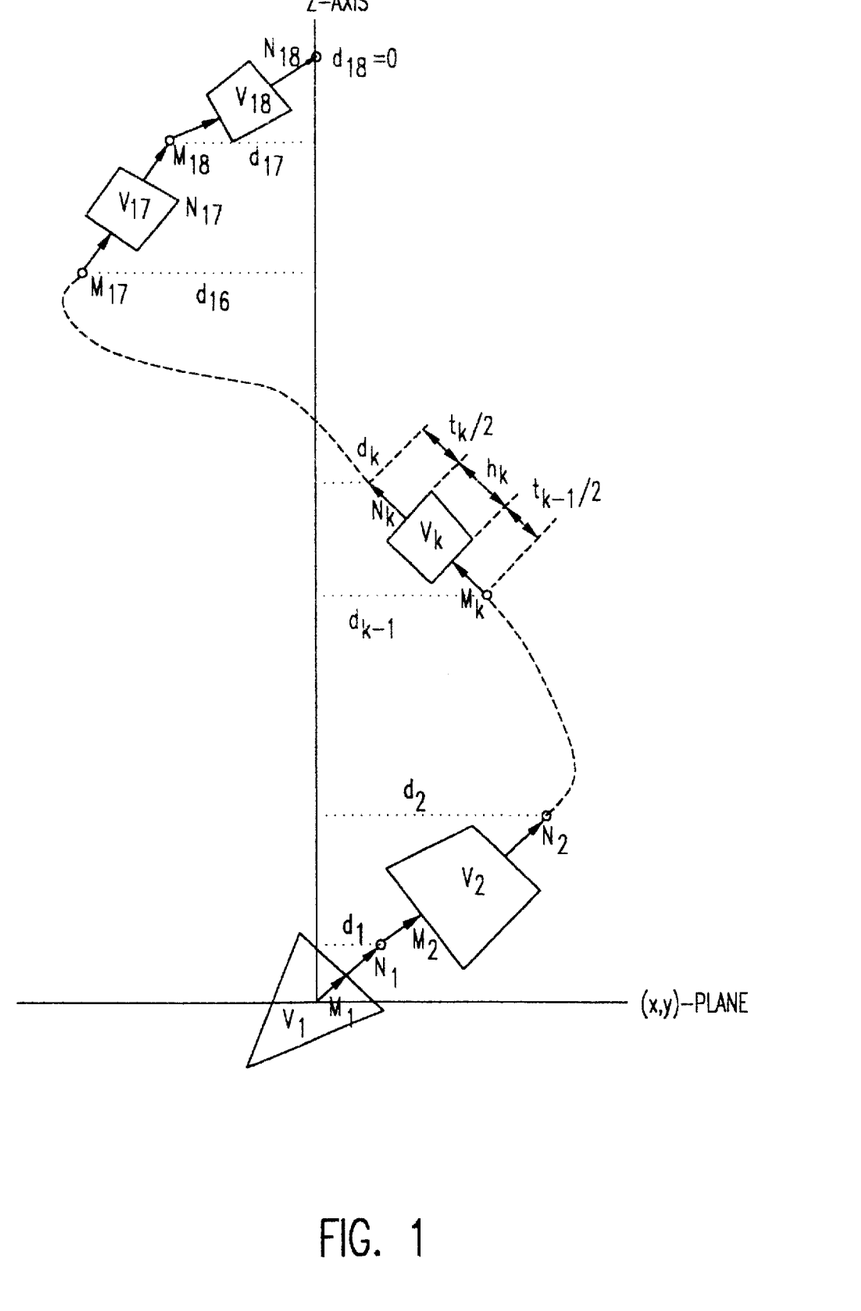
FIG. 1 is a schematic diagram of a human spine with labels defining symbols used to formulate the mathematical model in accordance with the present invention.

The model is formed based on functions $f$ and vector fields X on manifolds $M=SO(3)^n$ or $M=SO(3)^n \times R^m$. For getting the shape of a spine as depicted in FIG. 1, $M=SO(3)^{16}$. If the cervical vertebra is to be included, $M=SO(3)^{23}$ would be used and applied what is below mutatis mutandis. For certain inverse problems associated with the spine, $M=SO(3)^n \times R^m$ may be used.

The problem is to solve for local minima of functions $f$ or zeros of vector fields X:

$$X(x)=0, x \in M$$

For this, Newton's method is adapted to the manifolds in question, first for vector fields as follows. Let x' be the next step from a point x via an application of Newton's method.

$$x'=R(-\nabla X(x)^{-1}X(x)), \quad (1a)$$

where $\nabla X$ the covariant derivative of X and R a retraction map from the tangent bundle T(M) to the manifold M. The sequence gotten from successive applications of (5) converges rapidly to a solution x* of (*) provided the starting point is in the basin of attraction. For X the gradient of a function $f$, then the solution x* of (*) is at a local minimum of $f$ if the Hessian of $f$ at x* is positive definite.

Computing covariant derivatives as well as gradients on the above manifolds is performed using the group structure of SO(3) (matrix multiplication) and its differential structure (the tangent space $T_1(SO(3))$ at the identity is the set of 3×3 antisymmetric matrices).

Local minima of a norm of a vector valued function F defined on a manifold may also be found by adapting the method of nonlinear least squares, also known as the Newton-Gauss method. Here:

$$x'=R(-DFx)\uparrow F(x)), \quad (1b)$$

where DF(x)↑ is the Moore-Penrose inverse of the derivative of DF(x) on the manifold M (if M is a submanifold of a multi-dimensional Euclidean space and F is defined on a neighborhood of M, then DF(x) is usual derivative of F restricted to the tangent space $T_x(M)$ of M at x). Convergence of the Newton-Gauss method is slower and less certain than Newton's method, but Newton-Gauss is better adapted for some local minima.

In the case that the manifold M is a Lie group, a vector field on M as a vector valued function G with values in the Lie algebra of M may be considered, and the Newton's method can also be applied to G as follows:

$$x'=R(-DG(x)^{-1}G(x)). \quad (1c)$$

Those skilled in the art familiar with calculus on manifolds will readily understand and be able make the calculations indicated in equations (1a–1c).

FIG. 1 shows a diagram of the spine. In this diagram, the labeling of spinal elements (vertebral bodies) from bottom to top proceeds from the Sacrum, through the five lumbar vertebrae, followed by the twelve thoracic vertebrae as follows. $V_1=S1$, $V_2=L5$, $V_3=L4$, ..., $V_{18}=T1$. For k=2, 3, ..., 18, $M_k=M_k(i,j)$ is an orthogonal matrix representing an orthogonal frame, the third column of which is orthogonal to the lower surface of the vertebral body of $V_k$ and the base point of which is at the center of the disk between $V_k$ and $V_{k-1}$. For k=1, 2, ..., 18, $N_k=N_k(i,j)$ is an orthogonal matrix representing an orthogonal frame, the third column of which is orthogonal to the upper surface of $V_k$, the base point of which is at the center of the upper surface. Let $d_k$ denote the distance from the z-axis to the midpoint of the disk between $V_k$ and $V_{k-1}$, $t_k$ the thickness of the disk between $V_k$ and $V_{k-1}$, and $h_k$ the height of $V_k$.

The spinal energy is defined as $\frac{1}{2}\|F\|^2$, where F is a vector-valued function of the set of variables $M=(M_k(i,j)|k=2, \ldots, 17, i, j=1, 2, 3)$; namely $$F(M)=( \ldots, w_{k-1}(i,j)(M_k(i,j)-M_{k-1}N_{k-1}(i,j)), \ldots, u_k d_k, \ldots ), \quad (2)$$

where the stiffness coefficients are $w_k(i,j)$ and $u_k$ are non-negative values and $$d_k^2 = \sum_{j=1}^{k} \left[\left(\frac{h_j+t_{j-1}}{2}\right)M_j(1,3)+\left(\frac{t_j}{2}\right)M_k N_k(1,3)\right]^2 + \sum_{j=1}^{k} \left[\left(\frac{h_j+t_{j-1}}{2}\right)M_j(2,3)+\left(\frac{t_j}{2}\right)M_k N_k(2,3)\right]^2 \quad (3)$$

In equation (3), set $t_0=0$ as there is no spinal element $V_0$. Spinal energy is then $$\frac{1}{2}\|F\|^2 = \frac{1}{2}\left(\sum_{k=2}^{18}\sum_{i,j=1}^{3} w_{k-1}(i,j)^2(M_k(i,j)-M_{k-1}N_{k-1}(i,j))^2 + \sum_{k=2}^{18} u_k^2 d_k^2\right). \quad (4)$$

$M_1$ and $M_{18}$ are fixed initial conditions. Spinal energy depends on stiffness coefficients which are universal parameters and the following patient specific parameters: $(N_k(i, j), h_k, t_k|k=1, \ldots, 18, i, j=1, 2, 3)$ as well as $M_1$ and $M_{18}$. The lengths $h_k$ and $t_k$ are gotten from radiographic data for individuals. The stiffness coefficients $w_k(i, j)$, $u_k$ are empirical values calculated from human data by a method described later. However, in order to incorporate spinal motion limits, the stiffness coefficients associated with components of orthogonal matrices that approximate angles of rotation about the z, y, x axes for small angles (namely, $w_k(2,1)$, $w_k(1,2)$, $w_k(3,2)$, $w_k(2,3)$) can be chosen as nonlinear functions which cause spinal energy to become infinite as the limits are approached. One way of doing this is to replace $w_k(i,j)$ in equation (4) by $$w_k(i,j)(1+\epsilon \log(a_k(i,j)-x)(x-b_k(i,j))) \quad (5)$$

where $x=M_k(i,j)-M_{k-1}N_{k-1}(i,j)$, $a_k(i,j)>b_k(i,j)$ and $\epsilon$ is chosen as a small number, for example $\epsilon=0.001$. The numbers $a_k(i,j)$, $b_k(i,j)$ for each stiffness coefficient are additional parameters. Ranges of spinal motion have been studied and are accessible in the medical literature. From such papers, estimates for $a_k(i,j)$, $b_k(i,j)$ can be obtained. Another approach is to estimate these numbers from the dimensions of spinal elements and disk widths using trigonometry. For example, a planar region parallel and at a distance smaller than its dimensions to another region of similar size can be rotated only so much without the regions intersecting.

The shape of the spine is given by $$M=(M_k(i,j):k=2, \ldots, 17, i,j=1,2,3), \quad (6)$$

which minimizes $\frac{1}{2}\|F\|^2$, where the $M_k \in SO(3)$; namely, it is a solution to $X(M)=0$ where X is the gradient of $\frac{1}{2}\|F\|$ on $SO(3)^{16}$. It is found by applying the aforementioned methods to F or its gradient vector field X.

Figure 2A:
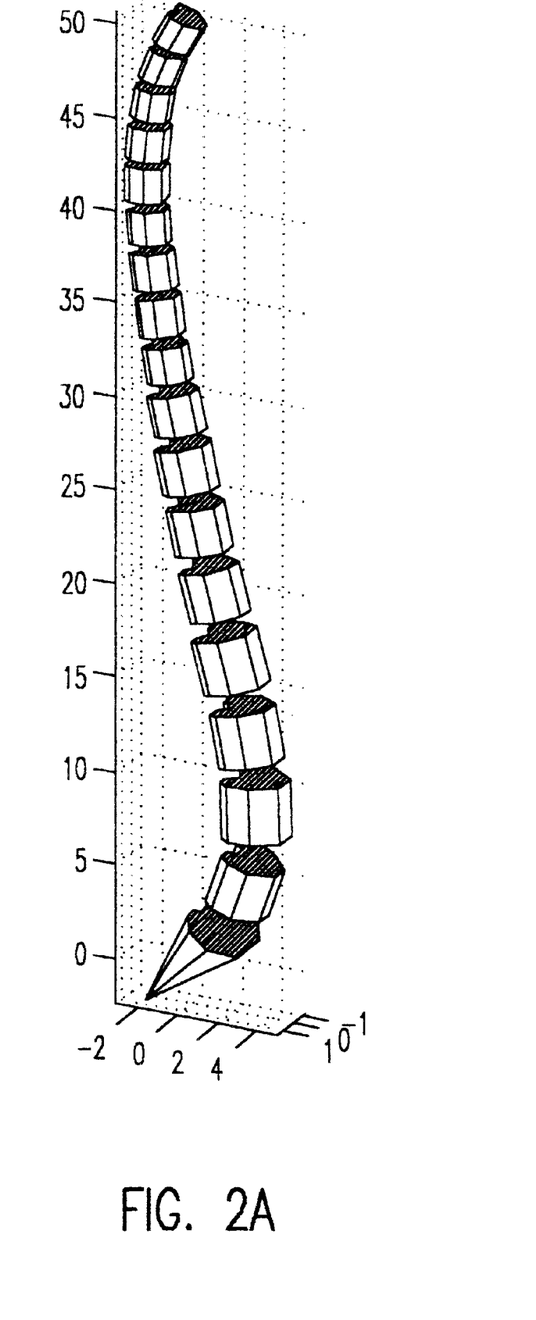
FIGS. 2a and 2b are three-dimensional graphical representations of a sample spine computed in accordance with the present invention, where elements of the sample spine are depicted as stylized versions of vertebral bodies.
Figure 2B:
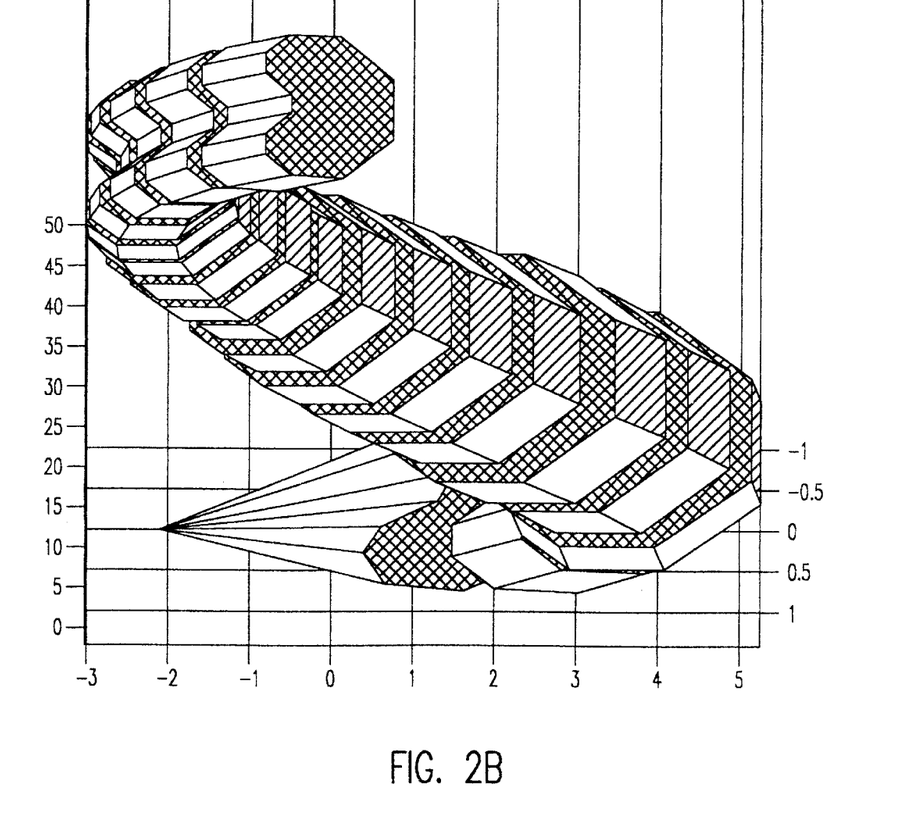

For some values of the parameters and initial conditions, the basin of attraction of Newton's method is large—for example, when $N_k$=identity and $M_1$, $M_{18}$ are rotations in the same plane—while for other situations the basins are small. For a small basin of attraction, a homotopy method is required which is as follows. First, get a solution where the basin of attraction is large. Next, perturb the parameters slightly toward the desired ones using the previous solution as the starting point for Newton's method. If the perturbation is not too large, the starting point will be in the basin of attraction, and Newton's method will converge to a new solution. Continue in this manner until the solution for the desired parameters is obtained. The Newton-Gauss and the Lie algebra methods can be similarly employed. FIGS. 2a and 2b are three-dimensional graphical representations of a spine shown from different views and produced in accordance with the above method. In computing these representations, the parameters in equations (3) and (4) are as follows: $h_j$'s range is between 1.7 and 3.2 centimeters as in a, more or less, typical spine; $t_j$'s range is between 0.3 and 1.3 centimeters; and exemplary values of $w_k$'s were chosen in the range between 1 and 20. Also, the $u_k$'s were chosen as follows: $u_1$ through $u_{17}=1$, and $u_{18}=10^4$. Finally, $N_k$ are identity matrices; the top surface of the sacrum given by the orthogonal matrix $M_{18}$ is rotated 27° off the vertical. Based on these parameters, the mathematical model of the present invention produced a graphical simulation of a human spine.

The ability to solve for points where the vector field X vanishes on manifolds by Newton's method allows the model to attack various inverse problems.

First, since F depends linearly on the stiffness coefficients as seen from equation (3), so does the vector field X=grad $(\frac{1}{2})\|F\|$. Thus starting with known shapes, say M*, for various human models and setting $$X(M^*)=0 \quad (7)$$

for those shapes leads to sets of linear equations with the stiffness coefficients squared as unknowns, the solution for which can be under or over determined depending on how many samples are involved. In either case, best estimates for stiffness coefficients can be gotten from the linear method of least squares.

Second, the gradient X(M) depends nonlinearly on $N_k$ and $h_j$. So given a desired shape M* one can solve X(M*)=0 for certain preselected $N_k$ and $h_j$ as variables by using Newton's method on manifolds of the form $M=SO(3)^n \times R^m$. Such solutions can be regarded as trial surgical procedures guiding surgeons as to how alter vertebrae to improve deformed spines.

The determination of the precise surgical procedure is done as follows. Computer trials can be made prior to surgery to determine feasible corrections. This amounts to solving an inverse problem; namely, a trial desired shape M* is fixed upon; a trial set of vertebral bodies $V_{k_1}, \ldots, V_{k_m}$ are selected; the vector equation X(M*)=0 is solved by Newton's method on a manifold $SO(3)^m \times R^k$ for a set of variables $N_{k_i}$ and $h_{j_j}$. Various spinal shapes affording good balance and sets of vertebral bodies to be altered can be tried in order to determine what is possible. Among the possible alternatives, the surgeon can choose the least invasive one giving the best balance.

Figure 3:
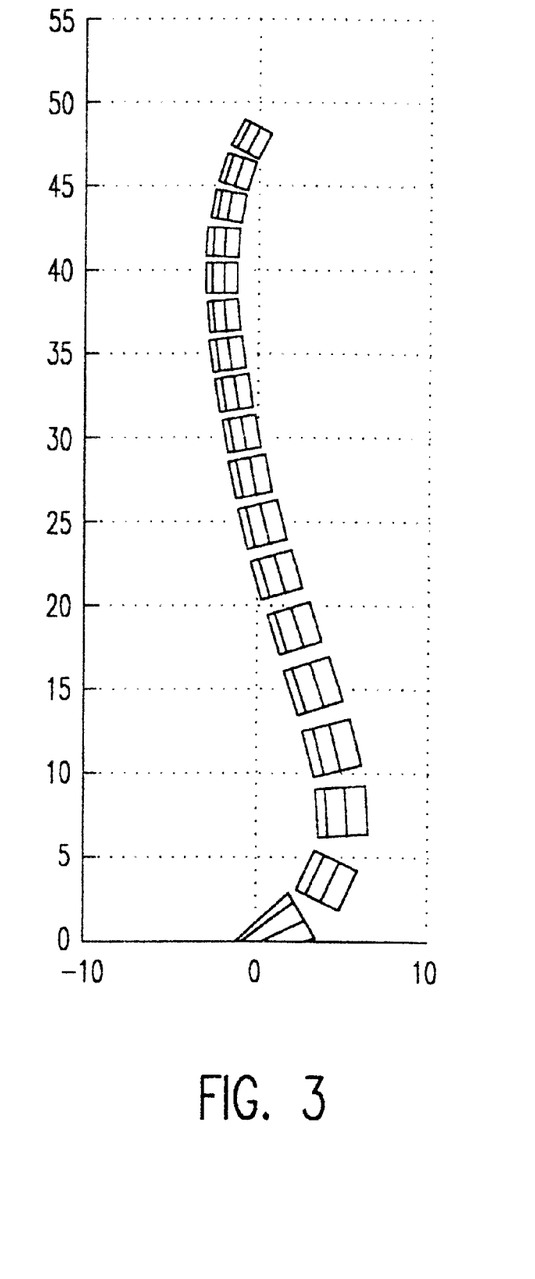
FIG. 3 is a profile view of a second sample spine computed in accordance with the present invention, where the lordotic curve of the second sample spine is larger than that of the first sample spine.

For example, FIG. 3 shows a side view of a spine differing only from the example of FIGS. 2a and 2b in that the top surface of the sacrum is rotated 60° off the vertical. This increases the degree of lordosis and pinching in the lower disks.

Figure 4:
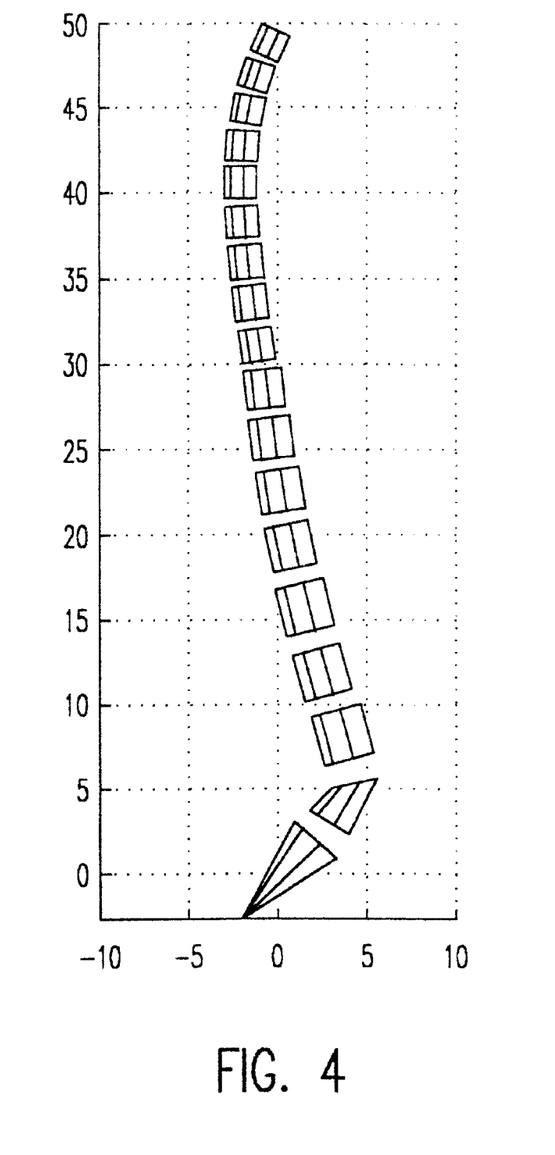
FIG. 4 is a profile view showing the shape of the second sample spine with a 45° wedge removed from $L_5$.

FIG. 4 shows the shape assumed by the spine upon removing a trail 45° wedge from the body of $L_5$. This was done by putting the appropriate values in the matrix $N_2$. The resulting computer graphics shows a reduction in lordosis and also in disk pinching and the spinal energy associated with those components in equation (4). Other trial corrections can be performed and compared, the most promising chosen for actual surgery. (It is noted that for simplicity of presentation, a two-dimensional distortion has been chosen here. The real power of the method of the present invention, however, is in dealing with three-dimensional distortions.)

Figure 5:
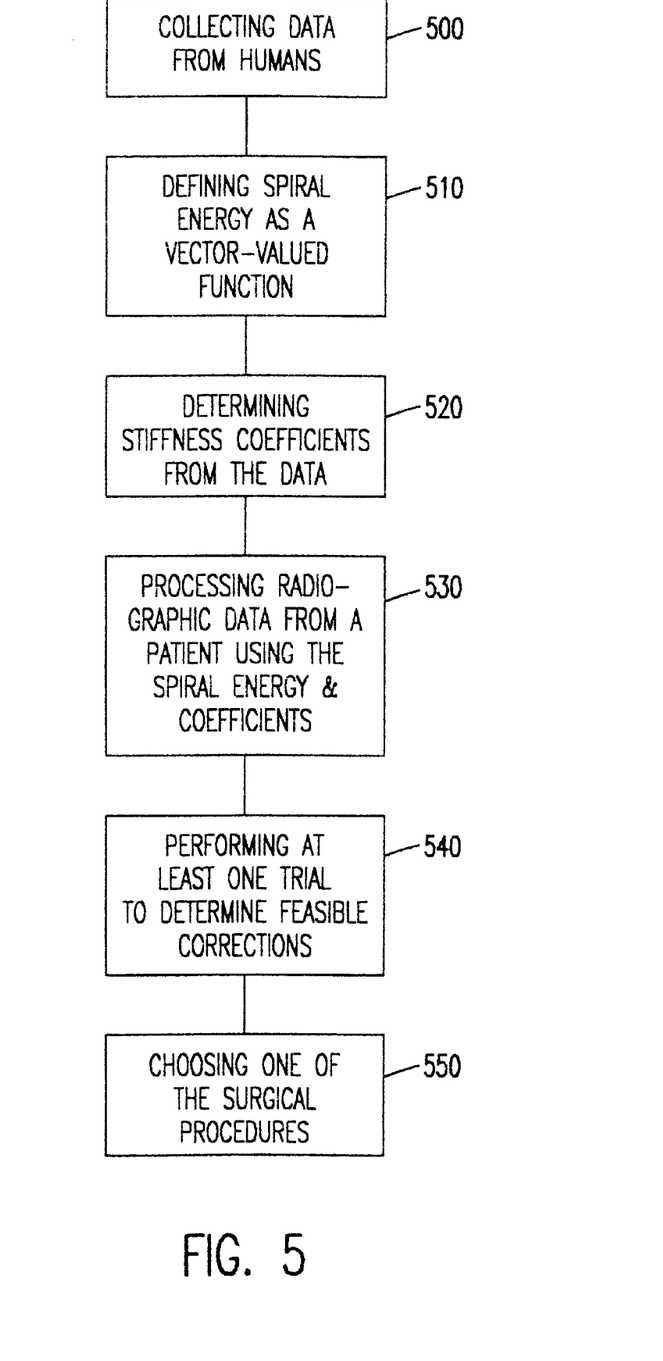
FIG. 5 is a flow chart showing steps included in the method of the present invention for modeling a diseased spine and choosing a surgical procedure for correcting deformities resulting from the disease.

Referring to FIG. 5, a flow diagram is provided of the method of the present invention as described above, wherein the method begins by collecting data from a group of humans (Block 500), defining spinal energy as a vector-valued function of a set of variables whereby the spine assumes a shape which minimizes spinal energy (Block 510), determining stiffness coefficients from the spinal data, where the spinal energy is dependent upon the stiffness coefficients which are universal for a large class of humans as determined from the spinal data (Block 520), processing radiographic data from a specific patient using the spinal energy and stiffness coefficients to find a shape of the patient's spine (Block 530), performing at least one trial to determine feasible surgical corrections (Block 540), and choosing one of the surgical procedures (Block 550). Preferably, the surgical procedure chosen is the least invasive, e.g., laproscopy by cutting wedges out to leave the spine as flexible as possible.

Figure 6:
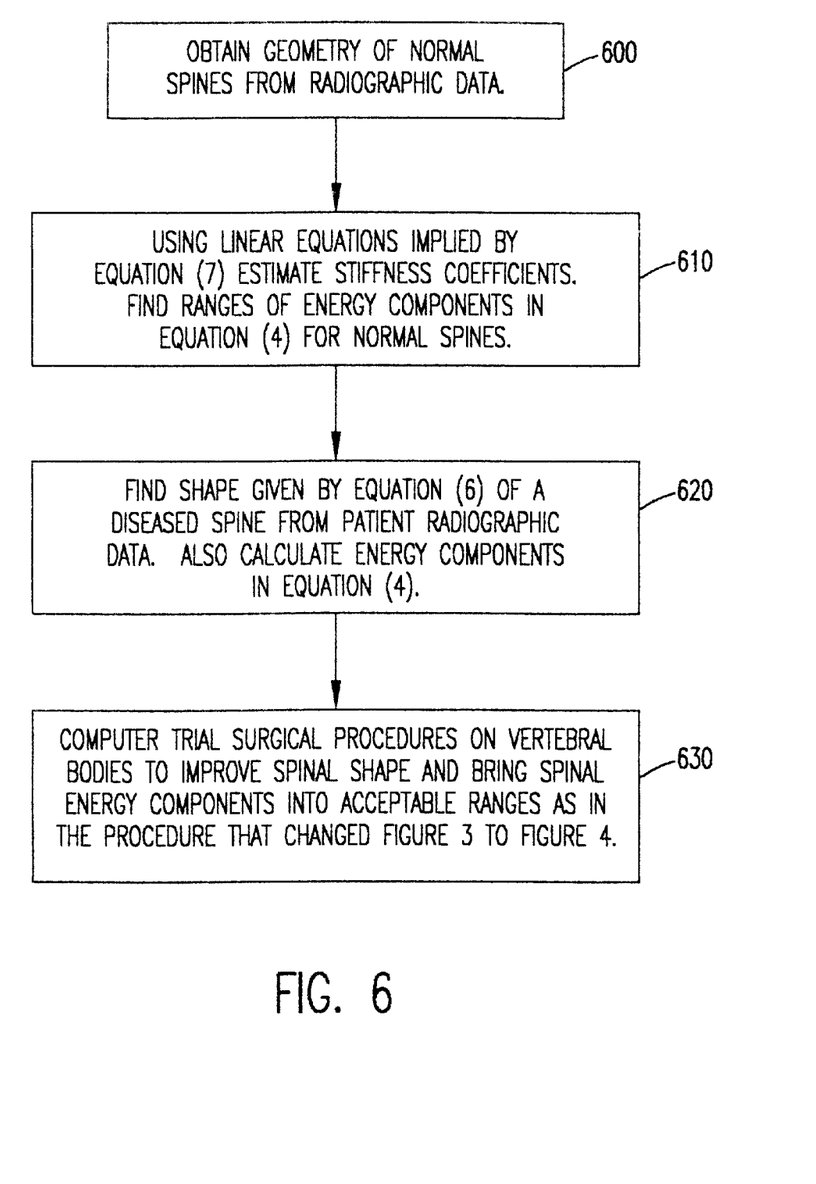
FIG. 6 is a flow chart showing steps included in a method for developing a model for predicting spinal deterioration.

Referring to FIG. 6, a method of the present invention for developing a model as a tool for predicting spinal deterioration begins by obtaining a geometry of normal spines from radiographic data. (Block 600). Then, linear equations implied by equation (7) are used to estimate stiffness coefficients. (Block 610). In equation (4), the spinal energy is given by the sum of spinal energies of various components. The next step of the method is thus to obtain normal ranges for these components from experimental data, and more specifically from normal spines. (Block 610).

Deviations from these ranges are then used to indicate where to expect maximal spinal deformity. Specifically, a shape given by equation (6) of a diseased spine is determined from patient radiographic data, and the energy components given in equation (4) are then calculated. (Block 620). Finally, computer trial surgical procedures are performed on vertebral bodies to improve spinal shape and bring spinal energy components into acceptable ranges, as in the procedure that changed FIG. 3 to FIG. 4. (Block 630). The least-invasive surgical procedure may then be employed to alleviate the problem.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method of modeling a spine, comprising the steps of:
   collecting spinal data from a plurality of humans;
   defining spinal energy as a vector-valued function of a set of variables, whereby the spine assumes a shape which minimizes spinal energy;
   determining stiffness coefficients from said spinal data, with spinal energy being dependent on corresponding to the stiffness coefficients as determined from said spinal data; and
   iteratively processing radiographic data from an individual patient using spinal energy and stiffness coefficients to find a shape of the patient's spine.

2. The computer-implemented method of modeling recited in claim 1, wherein Newton's method to the manifold $SO(3)^n$ to find a solution to spinal energy.

3. The computer-implemented method of modeling recited in claim 2, wherein when basins of attraction are small in Newton's method, homotopy methods are used to move from known solutions to unknown ones.

4. The computer-implemented modeling method recited in claim 2, further comprising:
   using Newton's method to solve the inverse problem of finding stiffness coefficients from human data by setting the gradient of spinal energy to zero.

5. A method for choosing a surgical procedure for correcting a spinal deformity, comprising:
   forming a model that represents said spinal deformity in accordance with steps that include:
   (a) collecting spinal data from a plurality of humans;
   (b) defining spinal energy as a vector-valued function of a set of variables, whereby the spine assumes a shape which minimizes spinal energy;
   (c) determining stiffness coefficients from said spinal data, with spinal energy being dependent on the stiffness coefficients as determined from said spinal data; and
   (d) iteratively processing radiographic data from an individual patient using spinal energy and stiffness coefficients to find a shape of the patient's spine;
   performing at least one trial using said model to determine a one or more corrections for said spinal deformity; and
   choosing a surgical procedure which corresponds to a least invasive one of said one or more corrections.

6. The method recited in claim 5, wherein said performing step includes:
   identifying a desired shape of said spine; and
   identifying a set of vertebral bodies corresponding to said desired shape.

7. A method for forming a tool for predicting spinal deterioration,
   forming a model that represents said spinal deformity in accordance with steps that include:
   (a) collecting spinal data from a plurality of humans;
   (b) defining spinal energy as a vector-valued function of a set of variables, whereby the spine assumes a shape which minimizes spinal energy;
   (c) determining stiffness coefficients from said spinal data, with spinal energy being dependent on the stiffness coefficients as determined from said spinal data; and
   (d) iteratively processing radiographic data from an individual patient using spinal energy and stiffness coefficients to find a shape of the patient's spine;
   wherein said vector-valued function represents said spinal energy as a sum of spinal energies of various spinal components, and wherein said method further includes:
   (e) obtaining normal ranges for said components based on experimental human data; and
   (f) predicting future spinal deterioration by detecting deviations from said ranges to indicate where to expect maximal spinal deformity.

8. The method recited in claim 7, further comprising:
   performing at least one trial using said model to determine a one or more corrections for said spinal deformity; and
   choosing a surgical procedure which corresponds to a least invasive one of said one or more corrections.

* * * * *